Nov. 3, 1970     J. LAGERWEY     3,537,765
ROTARY SUPPORTS AND ASSOCIATED VIBRATION DAMPERS
FOR FAST SPINNING BODIES OF REVOLUTION
Filed Aug. 21, 1968

INVENTOR
JOHANNES LAGERWEY

BY Cushman, Darby & Cushman
ATTORNEYS

United States Patent Office 3,537,765
Patented Nov. 3, 1970

3,537,765
ROTARY SUPPORTS AND ASSOCIATED VIBRATION DAMPERS FOR FAST SPINNING BODIES OF REVOLUTION
Johannes Lagerwey, Leidschendam, Netherlands, assignor to Reactor Centrum Nederland, The Hague, Netherlands, an institute of the Netherlands
Filed Aug. 21, 1968, Ser. No. 754,398
Claims priority, application Netherlands, Aug. 25, 1967, 6711711
Int. Cl. F16c 23/00, 23/04, 25/04
U.S. Cl. 308—142                                  6 Claims

ABSTRACT OF THE DISCLOSURE

A rotary support for a fast spinning body, comprising at least one bearing adapted to move radially against a readjusting force and a vibration member provided between said body and said bearing and attached to said body, in which supporting members are provided between said bearing and a stationary member, said supporting members being so constructed as to make the relations between the readjusting force on and the radial movement of the bearing different from one another for movements of the bearing in different radial directions.

---

The invention relates to a rotary support and associated vibration damper for a fast spinning body of revolution, such as a turbine rotor, a gyroscope, an instrument comprising rotating mirrors or another device provided with a rotating system, comprising at least one bearing, of which the non-rotating part is connected to a stationary part of the device by supporting members permitting, in respect of the axis of rotation, radial movements of the bearing and exerting a radial readjusting force thereon, and a vibration damper provided between said bearing and the body of revolution and attached to said body, said vibration damper comprising a container, a damping member contained in said container and adapted to move against a readjusting force and a hermetically closed space extending between the container walls and the damping member and filled entirely or entirely except for some gas bubbles with liquid.

Figure 2:
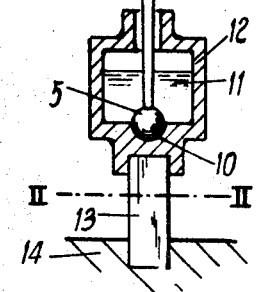

Such a rotary support associated with a vibration damper is already disclosed in the parallel Dutch patent application 6607482 of May 31, 1966 and represented in FIG. 2 thereof. In this support of the spinning system the body of revolution rests, through a first vibration damper inserted in its shaft by means of a pintle-sphere in a cup-shaped socket which forms part of the damping member of a second vibration damper mounted in a liquid-filled stationary container. The first vibration damper serves to damp the "whirl," that means the vibrations of the longitudinal axis of the body of revolution which have a frequency unequal to the number of revolutions. The second vibration damper damps the vibration with the so-called support-frequency which corresponds with a critical number of revolutions and which is the result of a self-frequency defined by the stiffness of the supports and the mass of the spinning system.

The invention has for its object to alter the rotary support and associated vibration damper of the kind referred to in such a manner, that the second vibration damper can be omitted, whereby a substantial simplification is obtained. It consists in that the mentioned supporting members are so constructed as to make the relations between the readjusting force on and the radial movement of the bearing different from one another for movements of the bearing in different radial directions. This means that the virtual deviation of the center of gravity of the spinning system and, as a result thereof, the position of the damping member within the container of the first vibration damper continuously change during each revolution, so that the first vibration damper becomes also active, when a critical number of revolutions is passed. In the rotary support and associated vibration damper of the kind shown in FIG. 2 of the parallel Dutch patent application 6607482, in which the supporting members of the bearing consist at least of an elastically flexible rod extending with its longitudinal axis in the axis of rotation and secured with its one end in the stationary part of the device and with its other end to the non-rotating part of the bearing, the invention can be realized in a simple manner. The rod needs then to have only an unround cross sectional area, so that the stiffness of the support in a given radial direction differs from that in other radial directions. It is advantageous to form said rod as a flat spring.

However, it is also possible to use, for the support of the non-rotating part of the bearing, a rod having a round cross sectional area. In that case the effect of the invention can be obtained when at least one stop member is provided in a plane extending transversely to said rod in a place between the ends of the rod, said stop member then being positioned in a given radial direction beside the rod and adapted to limit the movement of the rod in said direction. When the thus constructed bearing moves radially during the passing of a critical number of revolutions the rod supporting the bearing will, at a radial deviation in the given direction, bump up against said stop member and will thereby, as it were, be shortened, so that its stiffness will be changed.

In devices having a body of revolution adapted to rotate about a vertical axis a construction may be used for the purpose referred to, in which the non-rotating part of the bearing is suspended by wires of different length and/or directions. It is also possible to suspend the non-rotating part of the bearing by a cardan-cradle, of which the crossing horizontal journals extend at different levels.

Figure 1:
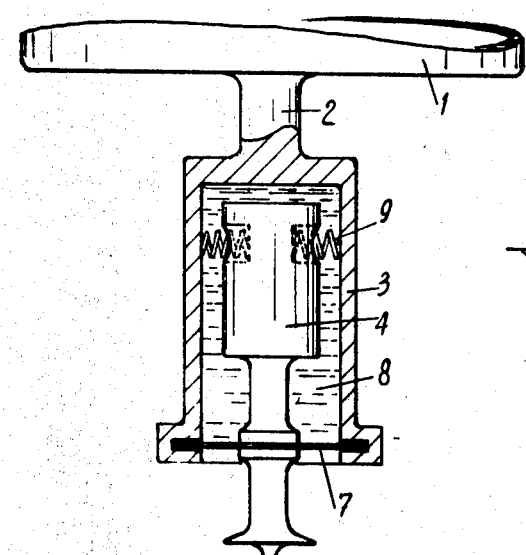
Figure 3:
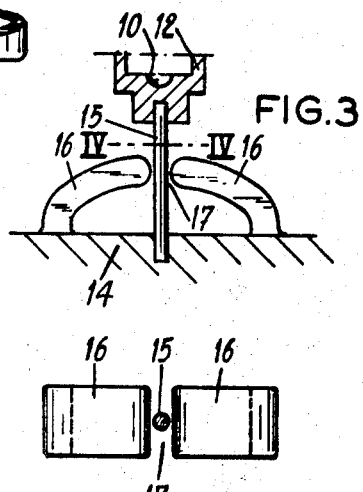
Figure 4:
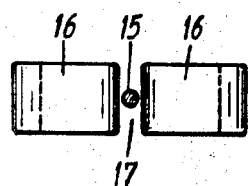
Figure 5:
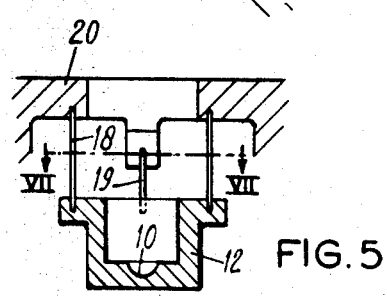
Figure 7:
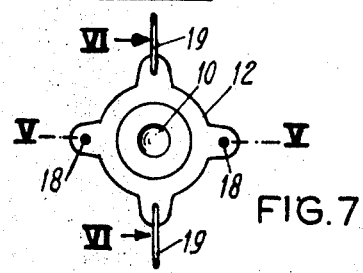
Figures 6, 8:
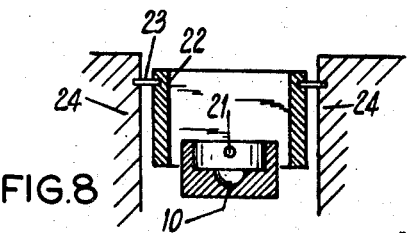

The invention will be further elucidated with the aid of the drawing. In the drawing is:

FIG. 1 a vertical cross sectional view of a support associated with a vibration damper constructed in accordance with the invention for a spinning body, FIG. 2 a horizontal cross sectional view taken on the line II—II in FIG. 1, FIG. 3 an elevational view of a variant of the lower part of the support shown in FIG. 1, FIG. 4 a horizontal cross sectional view taken on the line IV—IV in FIG. 3, FIG. 5 a vertical cross sectional view taken on the line V—V in FIG. 7 of a second variant of the lower part of the support shown in FIG. 1, FIG. 6 a vertical sectional view taken on the line VI—VI in FIG. 7, FIG. 7 a horizontal cross sectional view taken on the line VII—VII in FIG. 5, and FIG. 8 a vertical sectional view of a fourth embodiment of the lower part of the support for the spinning system illustrated in FIG. 1.

In FIG. 1 a fast spinning body of revolution, say a turbine wheel, a gyroscope disc, a cylinder provided with mirrors or another rotating body, is designated by 1. This body of revolution is provided at its lower end with a shaft 2 which ends in a container 3 shaped as a vessel turned upside down. Provided in the container 3 is a damping member 4 which forms an integral part with a vertical pintle 6 ending in a sphere 5. The part constituted by the damping member 4 and the pintle 5, 6 is connected with the container 3 by a diaphragm 7 which closes the container 3 hermetically and permits the damping member 4 to move radially in respect of the container 3. Furthermore, the container 3 is filled entirely or entirely except some gas-bubbles with damping liquid 8. Readjusting forces are exerted on the damping member 4 and the pintle 5, 6 by the diaphragm 7 and springs 9, said diaphragm and springs trying to keep the damping member 4 and the pintle 5, 6 with their longitudinal axes in the longitudinal axis of the body of revolution 1. The pintle sphere 5 rests in a cup-shaped socket 10 which forms the bottom of a vessel 12 filled with lubricating oil 11. This vessel 12 is attached to the upper end of a vertical elastically flexible rod shaped as a flat spring 13. The lower end of said flat spring is secured in a stationary part 14 of the device, of which the spinning system is constituted by the body of revolution 1 the support 2, 5, 6 rotating therewith and the damping device 3, 4, 7, 8, 9 forming part of said support.

Since the stiffness of the flat spring 13 in the direction at right angles to its plane is substantially smaller than that in the direction of its plane the pintle thrust bearing 5, 10 will be moved along an elliptical or oval path in a horizontal plane when the spinning system is set vibration. As a result thereof the damping member 4 will be moved in the container 3 in radial directions, so that the liquid 8 will not only operate on the whirl-movement but also on vibrations of the bearing due to movements of the spinning system, when a critical number of revolutions is passed. This device needs only one single vibration damper, which means a substantial simplification in respect of other damping systems for the same purpose.

In the embodiment shown in FIGS. 3 and 4 the spinning system may be the same as that shown in FIGS. 1 and 2. Therein, however, the socket 10 is attached to the upper end of a round rod 15, of which the lower end is secured in a stationary part 14. The rod 15 extends between two stop members 16 connected to the stationary part 14 and defining, in a place lying between the stationary part 14 and the socket 10, a rectangular gap 17 through which the rod extends with some clearance. If the system vibrates the rod 15 will bump up against the stop members 16, when the rod 15 moves in a direction at right angles with the longitudinal dimension of the gap 17. Thereby the rod 15 is, as it were, shortened or the stiffness thereof is increased, so that also in this case the pintle-thrust-bearing will be moved along an oval path and the vibration damper 3, 4, 7, 8, 9 will become active.

The variant of the non-rotating part of the support of the body of revolution shown in FIGS. 5, 6, 7 differs from the embodiments thereof shown in FIGS. 1, 2 and 3, 4 in that the vessel 12 containing the cup-shaped socket 10 is suspended by thin elastically flexible wires 18, 19 which are secured to a stationary part 20 of the device. The wires 18 thereof extend vertically and the wires 19 obliquely. This has the effect that the stiffness of the non-rotating part of the support in a given horizontal direction differs from the stiffness of said part in other horizontal directions, so that, when the spinning system starts to vibrate the pintle-thrust-bearing will be moved along a non-circular path, whereby the vibration damper illustrated in FIGS. 1, 2 will become active. The wires 18, 19 may be replaced by slack threads, so that only gravity will furnish the readjusting force.

In FIG. 8 the cup-shaped socket 10 is formed as a cradle which is suspended for swinging about a horizontal journal 21 by a second cradle 22 which, in its turn, is suspended for swinging about a second horizontal journal 23 lying at a higher level by the stationary part 24 of the device. In this case gravity furnishes the directional or readjusting force which for deviation in a given direction differs from that in other directions, so that the pintle-thrust-bearing will be moved along an oval path when the spinning system is set vibrating.

It is observed, that the embodiments shown in FIGS. 1, 2 and 3, 4 can also be used in spinning systems having a horizontal axis of rotation, when the pintle-thrust-bearing is replaced by a radial bearing such as a plain-bearing, a ball-bearing or a roller-bearing.

What I claim is:

1. A rotary support and associated vibration damper for a fast spinning body of revolution, such as a turbine rotor, a gyroscope, an instrument comprising rotating mirrors or another device provided with a rotating system, comprising at least one bearing, of which the non-rotating part is connected to a stationary part of the device by supporting members permitting, in respect of the axis of rotation, radial movements of the bearing and exerting a radial readjusting force thereon, and a vibration damper provided between said bearing and the body of revolution and attached to said body, said vibration damper comprising a container, a damping member contained in said container and adapted to move against a readjusting force and a hermetically closed space extending between the container walls and the damping member and filled entirely or entirely except for some gas bubbles with liquid, characterized in that said supporting members are so constructed as to make the relations between the readjusting force on and the radial movement of the bearing different from one another for movements of the bearing in different radial directions.

2. A rotary support and associated vibration damper according to claim 1, in which the supporting members of the bearing consist at least of an elastically flexible rod extending with its longitudinal axis in the axis of rotation, said rod being secured with its one end in the stationary part of the device and with its other end to the non-rotating part of the bearing, characterized in that the rod has an unround cross sectional area.

3. A rotary support and associated vibration damper according to claim 2, characterized in that said rod is a flat spring.

4. A rotary support and associated vibration damper according to claim 2, in which the supporting members of the bearing consist at least of an elastically flexible rod extending with its longitudinal axis in the axis of rotation, said rod having a round cross sectional area and being secured with its one end in the stationary part of the device and with its other end to the non-rotating part of the bearing, characterized in that at least one stop member is provided in a plane extending transversely to said rod in a place between the ends of the rod, said stop member being positioned in a given radial direction beside the rod and adapted to limit the movement of the rod in said direction.

5. A rotary support and associated vibration damper according to claim 1 for a device having a body of revolution adapted to rotate about a vertical axis, characterized in that the non-rotating part of the bearing is suspended by wires of different lengths and/or directions.

6. A rotary support and vibration amper according to claim 1 for a device having a body of revolution adapted to rotate about a vertical axis, characterized in that the non-rotating part of the bearing is suspended by a cardan cradle, of which the crossing horizontal journal extend at different levels.

References Cited

FOREIGN PATENTS 588,901    2/1925    France.

MARTIN P. SCHWADRON, Primary Examiner

F. SUSKO, Assistant Examiner